United States Patent [19]
Orlamünder et al.

[11] Patent Number: 6,066,047
[45] Date of Patent: May 23, 2000

[54] TORSIONAL VIBRATION DAMPER WITH A SLIDE BEARING

[75] Inventors: Andreas Orlamünder, Schweinfurt; Bernd Peinemann, Niederwerrn, both of Germany

[73] Assignee: Mannesmann Sachs AG, Schweinfurt, Germany

[21] Appl. No.: 09/036,842

[22] Filed: Mar. 9, 1998

[30] Foreign Application Priority Data

Mar. 7, 1997 [DE] Germany ............... 197 09 342

[51] Int. Cl.[7] ............................................. F16D 3/12
[52] U.S. Cl. ...................... 464/68; 464/66; 192/204; 74/574
[58] Field of Search ................ 464/68, 24, 66; 74/574; 192/213.2, 213.21, 204, 208, 70.17

[56] References Cited

U.S. PATENT DOCUMENTS

| | | | |
|---|---|---|---|
| 4,352,420 | 10/1982 | Maycock | 464/68 |
| 4,537,296 | 8/1985 | Lech, Jr. et al. | 192/204 |
| 4,635,780 | 1/1987 | Wiggen | 192/70.17 |
| 4,651,859 | 3/1987 | Frantz et al. | 192/204 |
| 4,651,860 | 3/1987 | Nagano | 192/204 |
| 4,914,799 | 4/1990 | Kyle | 192/208 |
| 5,014,842 | 5/1991 | Graton et al. | 192/204 |
| 5,219,431 | 6/1993 | Stretch | 192/208 |
| 5,617,939 | 4/1997 | Memmel et al. | 192/204 |
| 5,732,604 | 3/1998 | Lucienne | 192/204 |
| 5,816,973 | 10/1998 | Sadau et al. | 74/574 |
| 5,878,856 | 3/1999 | Sadau et al. | 74/574 |

*Primary Examiner*—Terry Lee Melius
*Assistant Examiner*—Kenneth Thompson
*Attorney, Agent, or Firm*—Cohen, Pontani, Lieberman & Pavane

[57] ABSTRACT

A torsional vibration damper has a drive-side transmission element and an output-side transmission element rotatable relative thereto. The output-side transmission element is centered relative to the drive-side transmission element via a radial slide bearing and can be held at a predeterminable axial distance from the drive-side transmission element by means of an axial slide bearing. The axial slide bearing has an inner circumference larger than the outer circumference of the radial slide bearing and rests, on the one hand, on at least one component of the first transmission element acting on the outer circumference of the radial slide bearing and, on the other, on at least one component of the other transmission element arranged on the inner circumference of the radial slide bearing, so as to form, together with these components, a covering for the radial slide bearing, by which the latter can be protected against an unwanted afflux of solid particles.

5 Claims, 6 Drawing Sheets

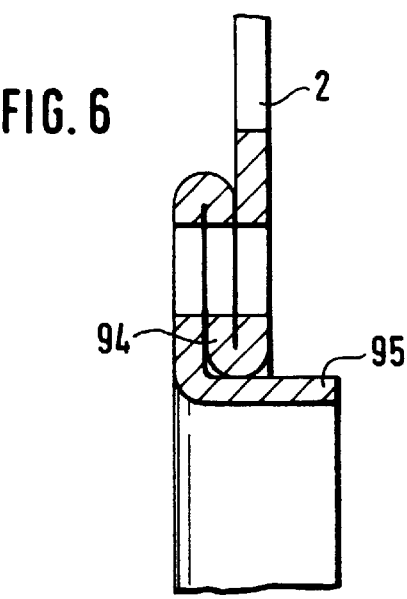
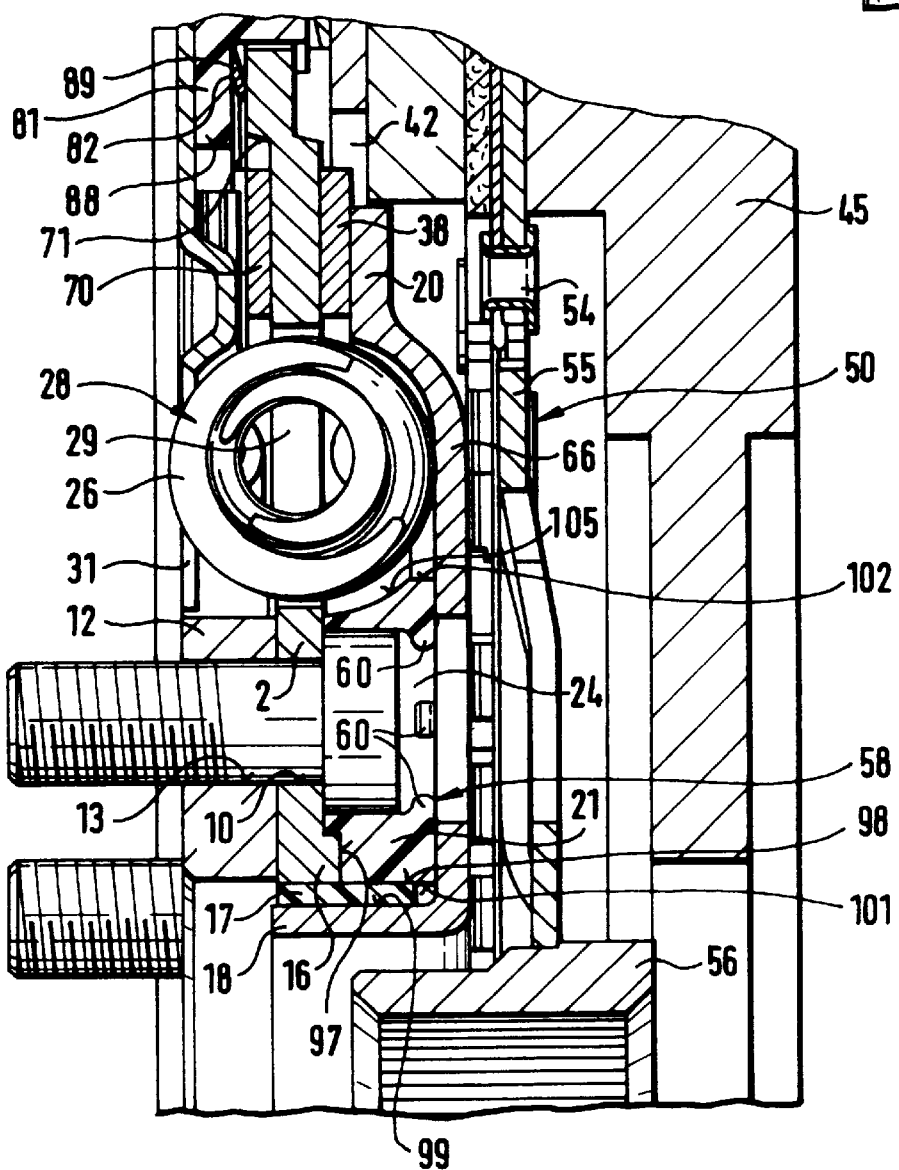

TORSIONAL VIBRATION DAMPER WITH A SLIDE BEARING

BACKGROUND OF THE INVENTION

1. Field of the Invention

The invention relates to a torsional vibration damper.

2. Description of the Related Art

A torsional vibration damper of the aforementioned type is known, for example, from DE German reference 34 11 092 C2, and has a drive-side transmission element and an output-side transmission element rotatable relative thereto. The output-side transmission element, according to FIG. 4 of the reference, is centered relative to the drive-side transmission element via a radial slide bearing and can be held at a predeterminable axial distance from the drive-side transmission element by means of an axial slide bearing. The axial slide bearing is arranged radially inside the radial slide bearing; specifically, so as to be located axially between a central journal embodied on the output-side transmission element and the crank shaft of a drive.

FIG. 3 of the aforementioned reference shows a similar torsional vibration damper, but with a roller bearing. This torsional vibration damper is embodied on its output-side transmission element with indentations, which are aligned with attachment means for attaching the drive-side transmission element to the crank shaft. Indentations of this type are intended to allow a pre-assembled torsional vibration damper to be attached to the crank shaft, after the insertion of the attachment means, by means of the aforementioned indentations. However, it is disadvantageous in indentations of this type that wear particles stemming from the friction clutch (shown in FIG. 1), and especially from the friction linings, can penetrate through the indentations into the region between the two transmission elements and thus enter the extension area of the bearing. In the case of roller bearings, this is not necessarily a great misfortune, especially when the roller bearing, as shown in FIG. 3, is capped on the side facing the recess. However, in the case of radial slide bearings, contamination with wear of this sort can lead to destruction. It is presumably for this reason that in the embodiment with the radial slide bearing in FIG. 4 of the aforementioned reference, no indentation is provided for the passage of attachment means, even though the radial slide bearing has a seal. If the aforementioned indentations for the attachment means are omitted, however, the mounting of the torsional vibration damper on a crank shaft becomes problematic. Furthermore, an added seal increases the cost of construction and reduces durability, because it behaves as a wear component. Damage to the seal can lead to destruction of the radial slide bearing due to penetrating solid particles. For these reasons, the space and cost advantages attained by the use of slide bearings are at least partially nullified.

SUMMARY OF THE INVENTION

Accordingly, it is an object of the present invention to embody the slide bearing, in a torsional vibration damper with a slide bearing between the transmission elements, so that contamination-related damage to the radial slide bearing is avoided under all circumstances.

Pursuant to this object, and an others which will become apparent hereafter, one aspect of the present invention resides in a torsional vibration damper having a drive-side transmission element, an output-side transmission element rotatable relative to the drive-side transmission element, a radial slide bearing arranged so as to center the output side transmission element relative to the drive-side transmission element, and an axial slide bearing arranged so as to hold the output-side transmission element at a predeterminable axial distance from the drive-side transmission element. The drive-side transitional element has a component arranged to act on an outer circumference of the radial slide bearing and the output-side transmission element has a component arranged to act on an inner circumference of the radial slide bearing. The axial slide bearing is arranged to rest on the component of the drive-side transmission element that acts on the outer circumference of the radial slide bearing and on the component of the output-side transmission element that acts on the inner circumference of the radial slide bearing so as to form, together with these components, a covering for the radial slide bearing which protects the radial slide bearing from an afflux of solid particles.

Thanks to the feature according to which the axial slide bearing comes to rest on the adjacent component, seen in the axial direction, the axial slide bearing, in addition to performing its actual function, acts as a seal. This seal, in conjunction with the adjacent components that constitute the support surface (e.g., a primary flange, on the one hand, and a cover plate, on the other), forms a covering for the radial slide bearing, so that the radial slide bearing is protected against an of solid particles, most of which come from the area radially outside the axial slide bearing, i.e., the area where the friction linings of a clutch disk come into friction connection with the corresponding counter friction surfaces of a friction clutch. Because the axial slide bearing is supported on the respective adjacent components, the axial slide bearing, too, is protected against such solid particles. However, due to the lower load on the axial slide bearing, such solid particles are not as harmful in this case as in others, especially those of radial slide bearings. The task of screening the radial slide bearing against solid particles is also reliably performed by the axial slide bearing, when the latter, to allow the passage of the attachment means by which the torsional vibration damper is flanged onto the crank shaft of a drive, e.g., an internal combustion engine, has passageway openings located in the extension area of indentations embodied on a cover plate that runs axially between the axial slide bearing and the friction clutch. On the one hand, such passageway openings permit the attachment of attachment means; on the other hand, they also allow solid particles arising from wear to penetrate to the interior of the torsional vibration damper in the area of the friction clutch. Because the axial slide bearing acts as a sealing element, these penetrating solid particles cannot penetrate either radially inward to the radial slide bearing or radially outward, e.g., to the springs of a damping device, and thus can cause no damage. Since the axial slide bearing rests on both sides, respectively, on an associated component, the particles are trapped in the passageway openings of the axial slide bearing. The axial slide bearing performs this function regardless of whether it covers the radial slide bearing completely, seen in the axial direction, or encloses it only partially, or is arranged axially adjacent to it.

With suitable configuration of the passageway openings in the axial slide bearing, the axial slide bearing, in addition to performing both its actual bearing function and its protective function relative to the radial slide bearing, can carry out yet another function, namely, that of protecting against the loss of the attachment means before the torsional vibrational damper is attached to the crank shaft of a drive. The attachment means can be held in the given passageway openings of the axial slide bearing in a friction-locking or a positive-locking manner.

According to another embodiment of the invention the axial slide bearing engages with the adjacent component of the drive-side transmission element via a toothing, so as to ensure that the passageway openings provided for the attachment means in the axial slide bearing align with corresponding passageway openings in other components of the drive-side transmission element. The insertion of the attachment means is hereby made even easier, because no angular orientation of the axial slide bearing relative to the components of the drive-side transmission element is necessary during the insertion of the attachment means.

According to a further embodiment, the axial slide bearing has a profiling on its outer circumference, which profiling enlarges the axial support surface of the axial slide bearing. As a result, there is adequate support surface even in the area of the indentations of an axially adjacent cover plate, for example. Additionally, adequate space is created for further components of the torsional vibration damper, such as the springs of a damping device arranged radially outside of the axial slide bearing.

According to still another embodiment, the running surface of the axial slide bearing is provided with passageway openings. This measure will initially strike those skilled in the art as unusual, because normally an effort is made not to reduce the size of the running surface. In the present case, however, the measure is acceptable. The profiling of the axial slide bearing allows the outer dimensions of the bearing in the area of its running surface to be made so large that the stress on the running surface remains acceptably small. At the same time, space is created for components to be arranged radially outside of the radial slide bearing at the smallest possible distance thereto.

According to a further embodiment, the axial slide bearing is embodied in one part with the radial slide bearing. As a result, the aforementioned functional advantages can be combined with even better production technology, especially when the combined bearing is produced as an injection molded part.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings:

FIG. 5 is a view as in FIG. 1, but with a loss protector for attachment means in the area of an axial slide bearing;

FIG. 6 shows another embodiment of the region for a radial slide bearing; and

DETAILED DESCRIPTION OF THE PRESENTLY PREFERRED EMBODIMENTS

Figure 2:
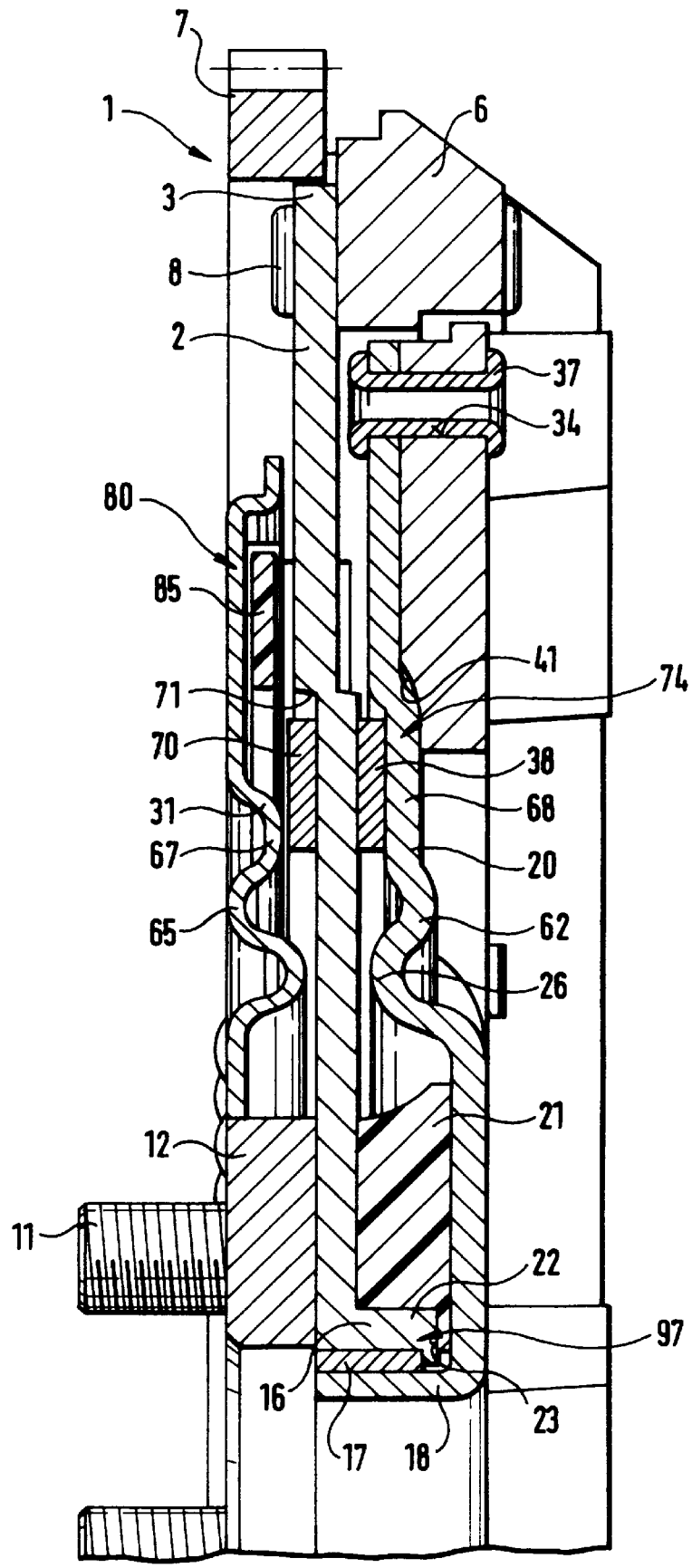
FIG. 2 is a view as in FIG. 1, but sectioned at an angular offset relative to FIG. 1.
Figure 3:
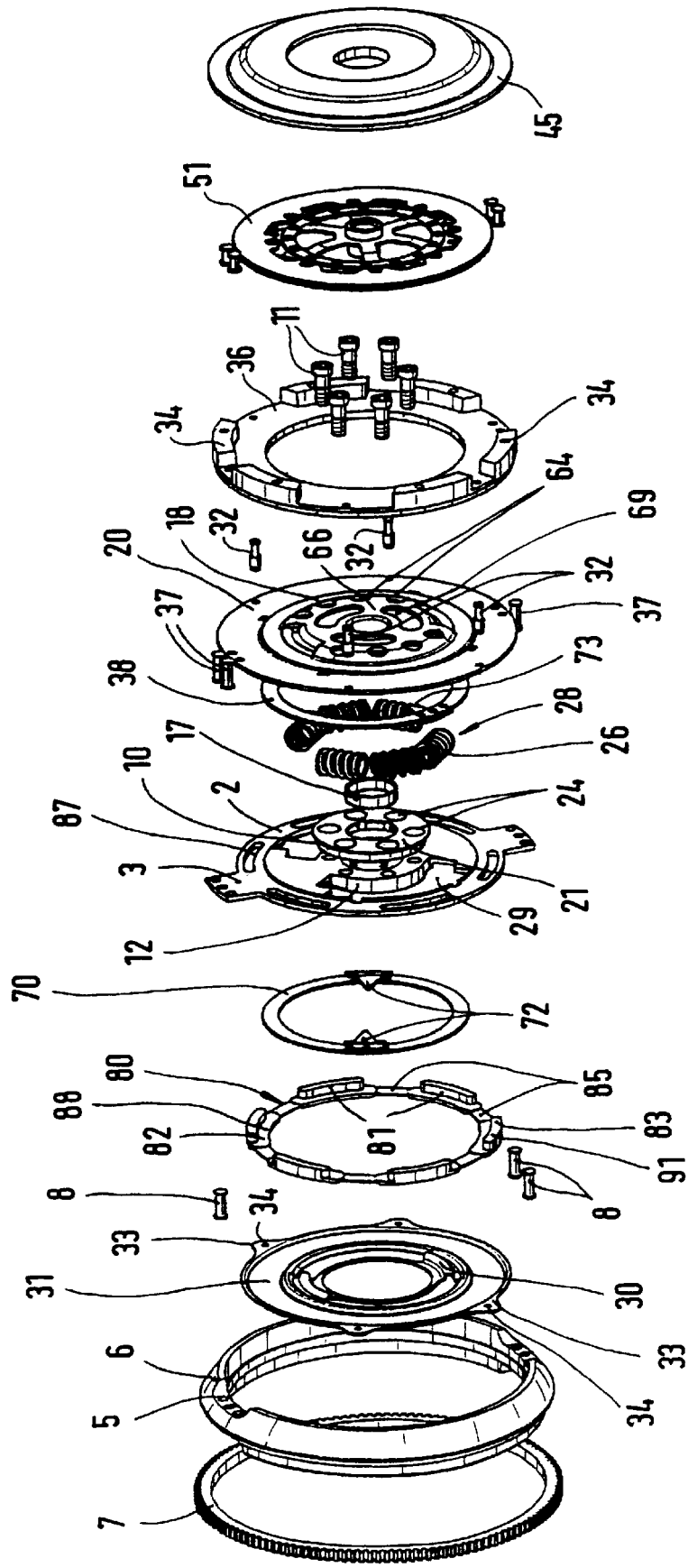
FIG. 3 is an exploded view of the individual parts of the torsional vibration damper.

The torsional vibration damper shown in the drawing has a drive-side transmission element 1 which has a primary flange 2 that runs radially outward. As FIGS. 2 and 3 show, the primary flange 2, in its circumferential area, has radial projections 3, each of which engages into a slot 5 of a ring-shaped drive-side centrifugal mass 6. The centrifugal mass 6, in its circumferential area, has a geared ring 7, which engages with a starter pinion (not shown). To attach the drive-side centrifugal mass 6 to the primary flange 2, rivets 8 are provided, which pass through borings in the radial projections 3 and in the centrifugal mass 6. Because the radial projections 3 of the primary flange 2 engage into the slots 5 of the drive-side centrifugal mass 6, a positive-locking connection is attained between the primary flange 2 and the centrifugal mass 6.

The primary flange 2, in the radially inner area, has passageway openings 10 for attachment means 11, which also pass through passageway openings in a distance ring 12 and serve to attach the torsional vibration damper to a crank shaft 15 (indicated by the dashed-dotted line in FIG. 1) of a drive, e.g., an internal combustion engine. The distance ring 12 hereby serves to establish an axially fixed connection of the primary flange 2 to the crank shaft 15.

The primary flange 2, at its radially inner end, acts as the primary hub 16, which accommodates a radial slide bearing 17, referred to hereinafter as the radial bearing 17. The radial bearing 17, with its inner circumference 99, in turn encompasses a secondary hub 18, which is embodied on the radially inner end of an output-side cover plate 20 and is directed toward the crank shaft 15. The primary flange 2, in the area of its primary hub 16, is equipped with axial projections 22, which engage into axial depressions 23 of an axial slide bearing 21, referred to hereinafter as the axial bearing 21. As a result, the axial bearing 21 is secured against rotation relative to the primary flange 2 by a positive lock 97, so that the passageway openings 24 in the axial bearing 21 align with the passageway openings 10 in the primary flange 2 as well as with the passageway openings 13 in the distance ring 12. The attachment means 11 for connecting the torsional vibrational damper to the crank shaft 15 can thus be inserted into all the passageway openings 10, 13 and 24 without any problems. To protect against loss of the attachment means 11, the passageway openings 24 of the axial bearing 21, especially an axial bearing 21 made of plastic, have such a small diameter that the attachment means, at the point of their largest diameter, can be pushed through the passageway openings 24 only with the application of an axial force. As a result, the axial bearing 21 performs the additional function of a loss protector 58. Of course, such loss protection can also be achieved in another way, as shown in FIG. 5, for example, where axially elastic journals or pins 60 that project radially inward in the extension areas of the passageway openings act as the loss protector 58.

Figure 7:
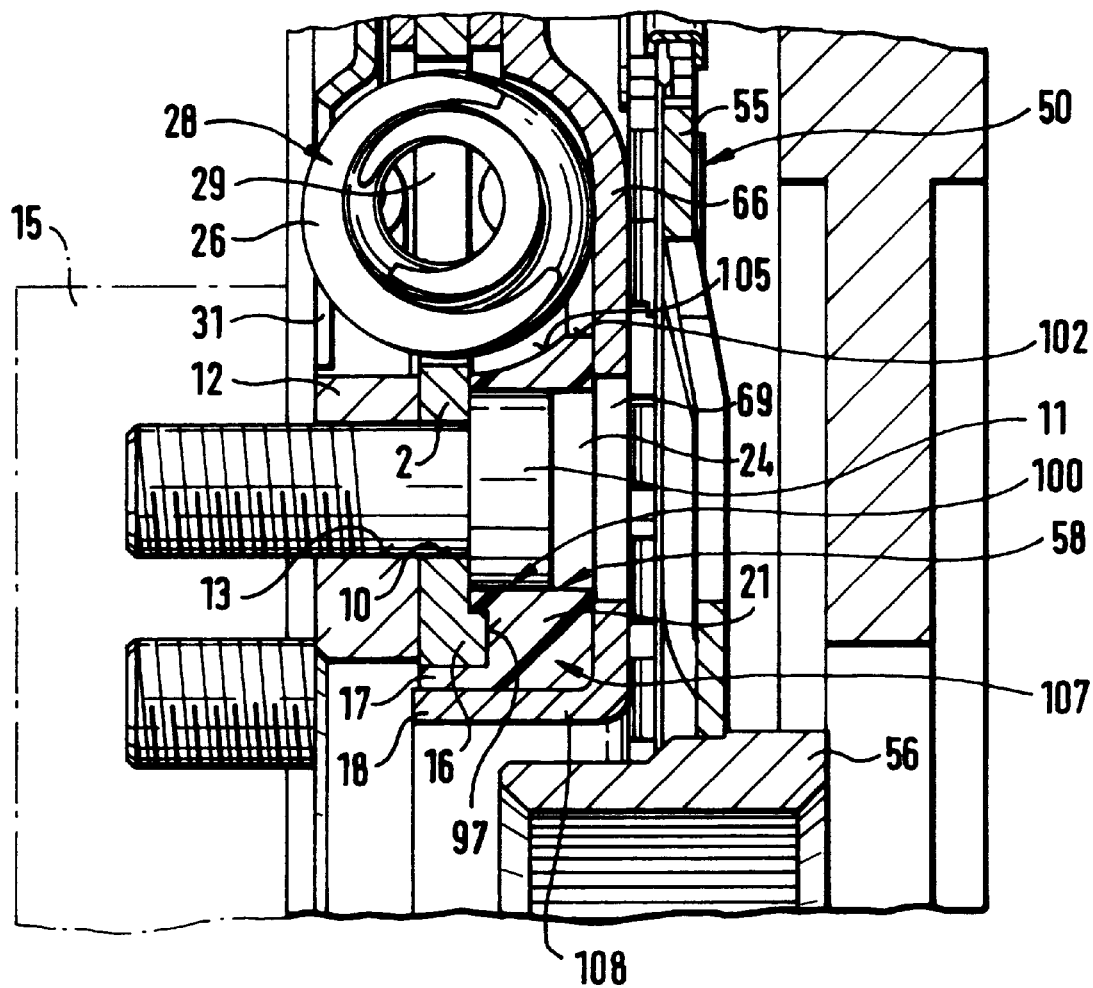
FIG. 7 shows an embodiment of the slide bearing as a combined bearing.

In contrast to the axial bearing 21, which can be made of plastic, e.g., polyamide with a teflon additive, the radial bearing 17 is preferably embodied with a steel protective shell, which is attached radially outside to the primary hub 16. This steel protective shell carries teflon-coated bronze as a run-in layer in which dirt particles and chips can become embedded. As a result, however, the sliding characteristic of the bearing becomes poorer, and the friction coefficient rises. An embodiment of the two bearings as a combined bearing 107 in one component, as in FIG. 7, can also be advantageous, leading to benefits related to production technology, especially when this common component is produced as an injection molded part 108. A wide variety of plastic and metal materials can be used for a combined bearing 107 of this type.

The axial bearing 21 ensures, first of all, that the required distance is maintained between the primary flange 2 and the output-side cover plate 20 and, secondly, that wear stemming from a conventional friction clutch 46 (shown only schematically) cannot penetrate to the endangered radial bearing 17, but instead remains in the area of the passageway openings 24 of the axial bearing 21. The radial dimensions of the axial bearing are therefore such that its inner circumference 101 encompasses the radial bearing 17, but does so with a diameter only insignificantly larger than that of the outer circumference 98 of the radial bearing 17. As a result, the axial bearing 21, with its inner circumference 101, remains radially inside the indentations 69 of the output-side cover plate 20.

The outer circumference 102 of the axial bearing 21 runs radially outside of the indentations 69 of the output-side cover plate 20. As a result, an adequate support surface is created on the output-side cover plate 20 by means of the axial bearing 21, despite the large indentations 69. To nonetheless provide adequate structural space for other components arranged radially outside of the axial bearing 21, e.g., the springs 26 of a damping device 28, the axial bearing 21, on its outer circumference 102, has a profile 105, which, starting from the side of the axial bearing 21 facing the cover plate 20, undergoes a diameter reduction in the direction of the primary flange 2. The curve of this profile 105 is adjusted in the axial direction to the circumferential curve of the springs 26. This constructive measure allows the springs 26 to be offset far inward radially, despite the radially large axial bearing 21 that offers the aforementioned advantages, so that there is sufficient space radially outside the springs 26 for the arrangement of the output-side centrifugal mass 36. As a result, a torsional vibration damper of a given radial size can attain an extremely compact structure in the axial direction.

The axial bearing 21, because it rests on the primary flange 2 as well as on the cover plate 20, acts as a dust-protective covering 100 for the radial bearing 17.

The aforementioned springs 26 are placed in windows 29 of the primary flange 2 as well as in windows 30 of a drive-side cover plate 31. The springs 26 can also be pressurized by control elements (not shown) of the output-side cover plate 20. As FIG. 3 shows more clearly, the springs 26 are surrounded by intermediate rings 38, 70, to which two control tips 72, 73, which are offset relative to each other by 180 degrees, are attached by riveted joint. These intermediate rings 38, 70 are held axially between the primary flange 2 and the drive-side cover plate 31, on the one hand, and between the primary flange 2 and the output-side cover plate 20, on the other. For this purpose, the drive-side cover plate 31 is embodied with an axial support 67 and the output-side cover plate 20 is embodied with an axial support 68, as FIG. 2 shows. In the present case, the intermediate rings 38, 70 are centered by means of the springs 26. However, it is equally conceivable to conduct the drive-side intermediate ring 70 by means of radial enlargement into an area of the primary flange 2 on which the latter has an axial shoulder 71, for example. This would result in a centering of the intermediate ring 70 from the radially outward direction. Such centering can be achieved by suitably shaping the primary flange 2 on its side facing the intermediate ring 38. The primary flange 2 would thus be embodied with radial securing mechanisms. The intermediate rings 38, 70 function by the respective engagement of their control tips 72, 73 between two springs 26. In this way, torsional vibrations introduced by the crank shaft 15 via the primary flange 2 can be conducted to a first spring 26, for example, and from there via a first intermediate ring, e.g., the intermediate ring 70, via its control tip 72 to a second spring 26, and from there in turn via the control tip 73 of the second intermediate ring 38 to the cover plates 20 and 31, which then act as the output-side transmission element 39. Of course, the individual springs 26, which are connected one behind the other, can be embodied with varying rigidity, so that the damping device 28 acts in various steps. The construction of the damping device 28 will not be discussed in greater detail at this point. However, it is vital to note that the springs 26 of the damping device 28 are located radially inside of friction linings 51, which are accommodated on a lining suspension 52 and connected via a riveted joint 54 to a carrier disk 55 of a clutch disk 50 that, in its radially inner area, is equipped with a hub 56 for placement upon a transmission shaft (not shown). The interesting feature of this clutch disk 50 is basically that the aforementioned riveted joint 54 is located on the radially inner end of the friction lining 51, so as to not penetrate disruptively into the friction area, which consists of a friction surface 48 of a clutch housing 45 (shown only schematically) of the friction clutch 46 and a counter friction surface 49 of an output-side centrifugal mass 36.

Figure 4:
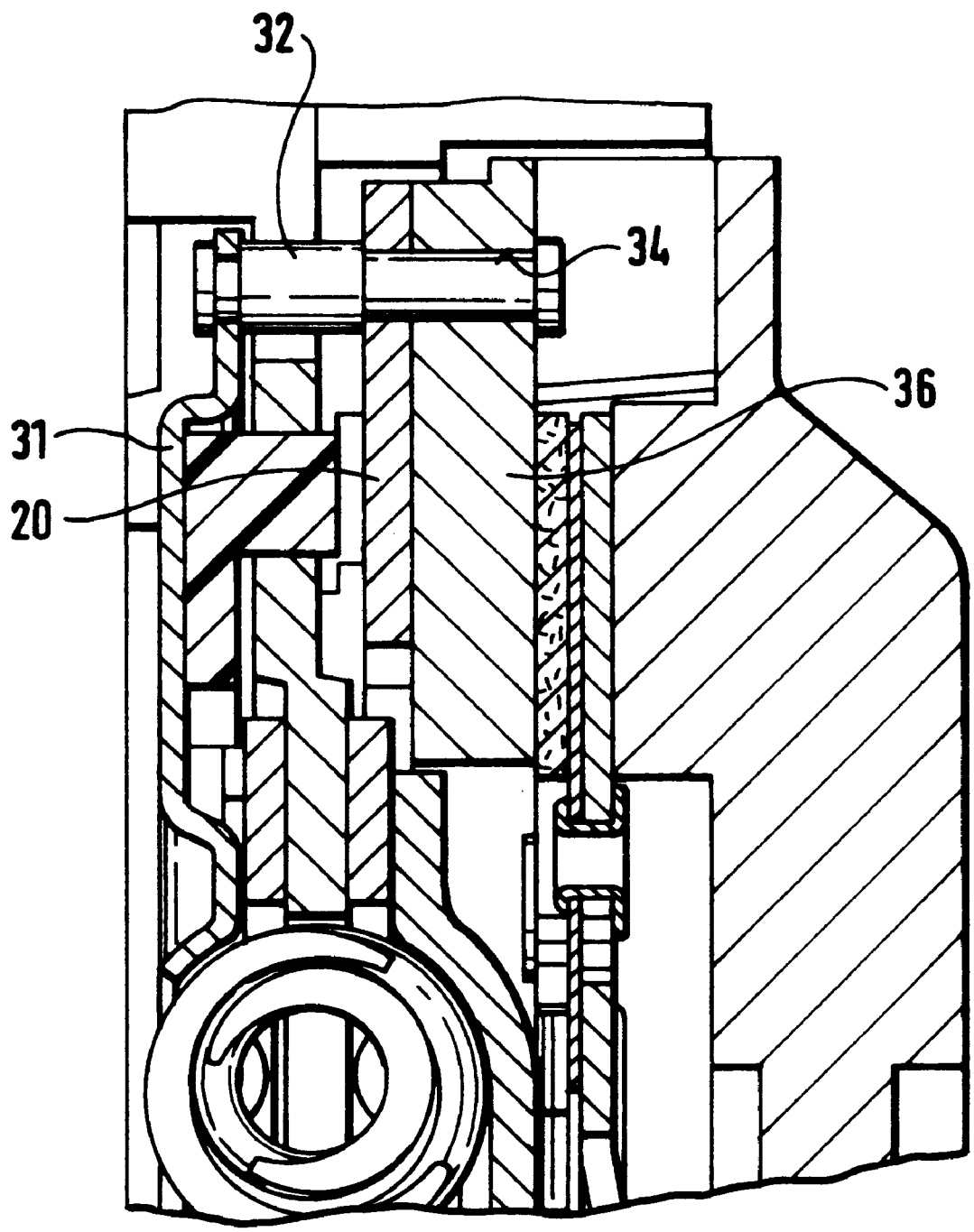
FIG. 4 is a sectional view showing a different area than in FIG. 1.

As FIG. 4 shows most clearly, the cover plates 20, 31 are connected to each other by means of spacing bolts 32. The spacing bolts 32 hold the cover plates 20, 31 at a fixed distance from each other, and also connect the cover plate 20 to the aforementioned output-side centrifugal mass 36, which has passageway openings 34 for this purpose. The output-side centrifugal mass 36 is thus also part of the output-side transmission element 39. The output-side cover plate 20 is also connected via rivets 37 to the output-side centrifugal mass 36. The drive-side cover plate 31 has radial shoulders 33 with the passageway openings 34 for accommodating the spacing bolts 32.

To save axial space, the output-side cover plate 20, in its radially outer region, relative to the radially central area, is turned around in the direction of the primary flange 2, in order to run, radially outside of this turnaround 74, substantially parallel to the primary flange. As a result, a surface is created in the radially outer area of the output-side cover plate 20 that is large enough in the radial direction to accommodate the output-side centrifugal mass 36, which, for its part, as noted above, serves as the counter friction surface 49 for the friction lining 51 of the clutch disk 50. To embody the friction lining 51 in a large enough fashion, however, it is necessary to draw the output-side centrifugal mass 36 radially farther inward than permitted by the radially outer area of the output-side cover plate 20. For this reason, the cover plate 20, in the area of its reversal 74, is equipped on part of its circumference with axial bulges 40 (FIG. 2), which run around the circumferential area of the adjacent intermediate ring 38. Provided between each two axial bulges 40 in the circumferential direction are recesses 42 (FIG. 1), which permit the passage of the intermediate ring 38 at this point. These recesses 42 create space that allows the output-side centrifugal mass 36 to extend sufficiently far radially inward. The centrifugal mass 36, on its side facing the output-side cover plate 20, has one recess 41 in the area of each axial bulge 40. This engagement of the axial bulges 40 into the recesses 41, seen in the circumferential direction, creates a rotation-proof connection of the output-side centrifugal mass 36 to the output-side cover plate 20. In addition, this measure, given a minimum axial extension of the torsional vibration damper, ensures a sufficient thickness of the output-side centrifugal mass 36 in the axial direction. This thickness and the stability associated with it are absolutely necessary for the centrifugal mass to effectively fulfill its function as the counter friction surface 49 for the friction linings 51. For the same reason, in the area of the cover plate 20, reinforcements 62 with a sectionally wave-shaped cross-section (see FIG. 2) are provided in the radially central area, by means of which reinforcements 62 the inner springs of a damper can be controlled. The ability of the cover plate 20 to withstand axial forces initiated by a conventional friction clutch is ensured by closed spring windows. In addition, the drive-side cover plate 31 also has the wave-shaped cross-section 65 for the control of torsional damper components, such as inner springs.

As FIG. 3 shows in greater detail, the output-side cover plate 20, in the radial area of the springs 26, has openings 64, which primarily serve to reduce the weight of the cover plate 20, without reducing its strength. Provided radially inside of these openings are fixed members 66, which run radially inward and establish a connection to the secondary hub 18. Provided between each two fixed members 66 in the circumferential direction is a recess 69. Each recess 69 permits access to two of the attachment means 11. The openings 64 as well as the recesses 69 promote cooling of the damping device 28 only to an insignificant effect, because no adequate discharge possibility exists for air that has entered. The space is thus sealed off axially adjacent to the recesses 69 by the axial bearing 21, for example, while air that has entered through the openings 64 is prevented from flowing radially outward through the intermediate rings 38, 70. However, after passing through the springs 26, such air can again emerge in the substantially axial flow direction on the side of the crank shaft 15.

A frictional device 80, which can be better seen as a whole in FIG. 3, is provided in the radial outer area of the primary flange 2. The frictional device 80 has a plurality of friction elements 81 distributed along the circumference in the form of friction pads, each of which is embodied with a section 88 that forms a first frictional area 82 and with a section 91 that forms a second frictional area 83. Located between these are connections 85, which keep the friction elements 81 connected to each other, but allow movement of the individual friction elements 81 in both the radial and axial directions. The friction elements 81, with their entire side facing the drive-side cover plate 31, rest on the cover plate 31, while the section 88 having the first friction area 82, i.e., the area of lesser axial extension width, is supported via an axial spring 89 on the primary flange 2. In contrast, the friction elements 81, with their axially larger section 91 (which in this embodiment lies radially farther outward), pass through circumferential openings 87 in the primary flange 2, so as to be supported, via an axial spring 90, on the output-side cover plate 20. The axial spring 90 hereby comes into contact with the second frictional area 83 of the friction elements 81. To allow this second frictional area 83 to function, the circumferential openings 87 in the primary flange 2 are larger in the circumferential direction than the extension width of the given friction element 81.

The friction device 80 functions so that, during very small torsional vibrations (i.e., during small movements by the drive-side transmission elements 1 relative to the output-side transmission element 39 in the circumferential direction), the section 91 having the second frictional area 83 is moved in the circumferential direction inside of the particular circumferential opening 87, without being able to reach the circumferential-side ends. In this operating state, the friction elements 81 are pressed by the axial spring 89 as well as the axial spring 90 against the drive-side cover plate 31. Because the drive-side cover plate 31 is part of the output-side transmission element 39, the output-side transmission element 39 then carries out a movement relative to the drive-side primary flange 2. The relative movement between these two components leads, via the friction elements 81 with the axial spring 89 connecting the primary flange 2, to a friction effect on the first friction area 82. At this point in time, no friction exists between the friction elements 81 and the output-side cover plate 20, because the cover plates 20, 31, as against the friction elements moved synchronously with the drive-side cover plate 31, cannot carry out any movements relative to each other. In this operating state, the axial spring 90 thus serves only to apply an axial pressure force.

As soon as the primary flange 2 is deflected so far in the circumferential direction that the ends of the circumferential openings 87 associated with this direction cause a take-along of the friction elements 81, no relative movement exists any longer between the primary flange 2 and the section 88 of the friction element 81 having the first friction area 82. The axial spring 89 serves only to apply an axial force, by means of which the friction elements 81 are pressed against the drive-side cover plate 31. The friction elements 81, however, now carry out a relative movement vis-a-vis the drive-side cover plate 31 as well as the output-side cover plate 20. As a result, friction exists not only between the drive-side cover plate 31 and the friction elements 81, but also between the sections 91 of the friction elements 81 and, via the axial spring 90, the output-side cover plate 20.

It is noteworthy here that two different frictional operating conditions can be established with only one friction part, i.e., the friction elements 81. As a result, the different friction requirements of such torsional vibration dampers can be met with minimum constructive and material expense. Furthermore, a friction device of this type can be compactly embodied and simply manufactured.

Further, it is notable that this friction device 80, regardless of whether it happens to be operating in the first or the second friction area, advantageously acts in a speed-dependent manner, because the connections 85 between two respective friction elements 81 are embodied flexibly in both the radial and axial directions. Higher centrifugal forces resulting from a higher speed thus cause the frictional elements 81, with their axially larger section 91, to rest in the radially outer area on the associated circumferential opening 87, and thus produce additional friction.

Figure 1:
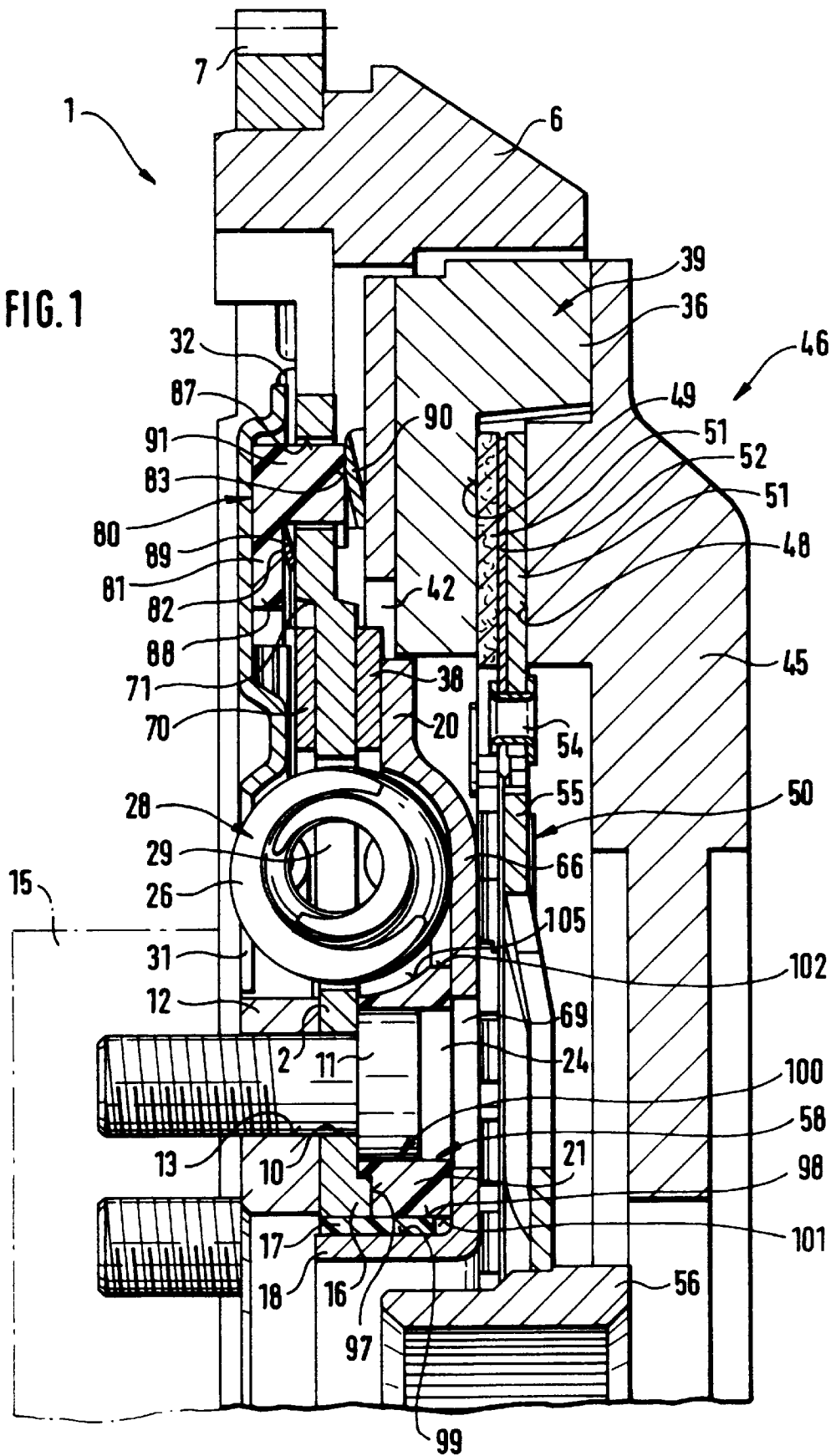
FIG. 1 is a torsional vibration damper, halved radially, in longitudinal section.

FIG. 6 shows a simplification according to which the primary flange 2, in the radially inner area, is folded so as to attain the axial balance relative to the crank shaft that is attained in the embodiment in FIG. 1 by means of the distance ring 12. Furthermore, after this flange fold 94, for the purpose of forming the required primary hub 95, the primary flange 2 is curved in the direction of the output-side. In a manner already described, the primary hub 95, on the primary flange 2, encompasses the radial bearing 17, which in turn encompasses the secondary hub 18 of the output-side.

The invention is not limited by the embodiments described above which are presented as examples only but can be modified in various ways within the scope of protection defined by the appended patent claims.

We claim:

1. A torsional vibration damper, comprising: a drive-side transmission element; an output-side transmission element rotatable relative to the drive-side transmission element; a radial slide bearing arranged so as to center the output-side transmission element relative to the drive-side transmission element; an axial slide bearing arranged so as to hold the output-side transmission element at a predeterminable axial distance from the drive-side transmission element, the drive-side transmission element having a component arranged to act on an outer circumference of the radial slide bearing, the output-side transmission element having a component arranged to act on an inner circumference of the radial slide bearing, the axial slide bearing being arranged to rest on the component of the drive-side transmission element that acts on the outer circumference of the radial slide bearing and on the component of the output side transmission element that acts on the inner circumference of the radial slide bearing so as to form, together with the component of the output-side transmission element and the component of the drive-side transmission element, a covering for the radial slide bearing which protects the radial slide bearing against an afflux of solid particles, apertures being provided in the component of the output-side transmission element; attachment means, that pass through the apertures, for connecting the drive-side transmission element to a crank shaft of a drive, the axial slide bearing having passageway openings for the attachment means, which passageway openings are arranged to rest at least partially inside a cross-sectional area of the apertures of the component of the output-side transmission element; and means, associated with each of the passageway openings of the axial slide bearing, for protecting against loss of the attachment means, the loss protector means being formed by the inner diameter of each passageway opening of the axial slide bearing being adjusted to a maximum diameter of the attachment means so that the attachment means, at the point of maximum diameter, can be pressed through the given passageway opening only under application of an axial force of a predeterminable level.

2. A torsional vibration damper as defined in claim 1, wherein the axial slide bearing, at least along on part of the axial extension of the axial slide bearing, is arranged on a part of the radial slide bearing which does not accommodate the component of the drive-side transmission element adjacent to the axial slide bearing.

3. A torsional vibration damper, comprising: a drive-side transmission element; an output-side transmission element rotatable relative to the drive-side transmission element; a radial slide bearing arranged so as to center the output-side transmission element relative to the drive-side transmission element; an axial slide bearing arranged so as to hold the output-side transmission element at a predeterminable axial distance from the drive-side transmission element, the drive-side transmission element having a component arranged to act on an outer circumference of the radial slide bearing, the output-side transmission element having a component arranged to act on an inner circumference of the radial slide bearing, the axial slide bearing being arranged to rest on the component of the drive-side transmission element that acts on the outer circumference of the radial slide bearing and on the component of the output side transmission element that acts on the inner circumference of the radial slide bearing so as to form, together with the component of the output-side transmission element and the component of the drive-side transmission element, a covering for the radial slide bearing which protects the radial slide bearing against an afflux of solid particles, apertures being provided in the component of the output-side transmission element; attachment means, that pass through the apertures, for connecting the drive-side transmission element to a crank shaft of a drive, the axial slide bearing having passageway openings for the attachment means, which passageway openings are arranged to rest at least partially inside a cross-sectional area of the apertures of the component of the output-side transmission element; and means, associated with each of the passageway openings of the axial slide bearing, for protecting against loss of the attachment means, the loss protector means including, at each passageway opening of the axial slide bearing, a pin provided in an area surrounding the passageway opening so as to project into the cross-sectional area of the passageway opening, the pin being deformable in an axial direction under application of an axial force for pressing the attachment means through the passageway opening.

4. A torsional vibration damper, comprising: a drive-side transmission element; an output-side transmission element rotatable relative to the drive-side transmission element; a radial slide bearing arranged so as to center the output-side transmission element relative to the drive-side transmission element; an axial slide bearing arranged so as to hold the output-side transmission element at a predeterminable axial distance from the drive-side transmission element, the drive-side transmission element having a component arranged to act on an outer circumference of the radial slide bearing, the output-side transmission element having a component arranged to act on an inner circumference of the radial slide bearing, the axial slide bearing being arranged to rest on the component of the drive-side transmission element that acts on the outer circumference of the radial slide bearing and on the component of the output side transmission element that acts on the inner circumference of the radial slide bearing so as to form, together with the component of the output-side transmission element and the component of the drive-side transmission element, a covering for the radial slide bearing which protects the radial slide bearing against an afflux of solid particles, the axial slide bearing having an outer circumference with an axially running profiling so as to create space; and damping means including springs arranged in the space formed by the profiling.

5. A torsional vibration damper as defined in claim 4, wherein the profiling is configured to match an outer contour of the springs.

* * * * *